United States Patent [19]

Kawai et al.

[11] Patent Number: 4,832,365
[45] Date of Patent: May 23, 1989

[54] PASSIVE SEAT BELT SYSTEM

[75] Inventors: Osamu Kawai; Shuichi Asano, both of Kanagawa, Japan

[73] Assignee: Nippon Seiko Kabushiki Kaisha, Tokyo, Japan

[21] Appl. No.: 85,354

[22] Filed: Aug. 14, 1987

[30] Foreign Application Priority Data

Aug. 18, 1986 [JP] Japan .................................. 61-191754

[51] Int. Cl.$^4$ ............................................. B60R 22/06
[52] U.S. Cl. .................................. 280/804; 180/286; 297/469
[58] Field of Search ....................... 280/804, 802, 803; 297/469; 180/282, 286

[56] References Cited

U.S. PATENT DOCUMENTS

| | | | |
|---|---|---|---|
| 4,209,186 | 6/1980 | Close | 280/803 |
| 4,225,155 | 9/1980 | Seiffert | 280/804 |
| 4,251,091 | 2/1981 | Weissner et al. | 280/804 |
| 4,708,366 | 11/1987 | Doty | 280/803 |
| 4,730,844 | 3/1988 | Patterson | 280/804 |

Primary Examiner—Charles A. Marmor
Assistant Examiner—Karin Tyson
Attorney, Agent, or Firm—Wegner & Bretschneider

[57] ABSTRACT

A passive seat belt system includes a timer and a control means. The timer is capable of reaching a time-up state upon an elapsed time of a predetermined interval of time after closure of an associated door and releasing the time-up state upon opening of the door. The control means allows a retractor to lock a webbing after the timer has reached the time-up state.

11 Claims, 12 Drawing Sheets

PASSIVE SEAT BELT SYSTEM

BACKGROUND OF THE INVENTION

1. Field of the Invention

This invention relates to a passive seat belt system for automatically applying or releasing a webbing when a passenger gets on or gets off an automotive vehicle, and more specifically to a means for allowing or preventing the operation of the emergency locking retractor (ELR) of such a passive seat belt system under predetermined specific conditions. 2. Description of the Prior Art The ELR of a passive seat belt system of the above kind is accompanied by an inconvenience that if it is actuated while not needed, for example, while its anchor is moving or when the associated passenger seat is slid for its positional adjustment, any further release of the webbing is locked and the anchor cannot be moved even when a passenger tries to move the anchor for making the webbing loose.

It may hence be contemplated to eliminate the above-described inconvenience by releasing the blocking of the ELR only when the outboard end of the webbing is at the applied end.

Figure 1:
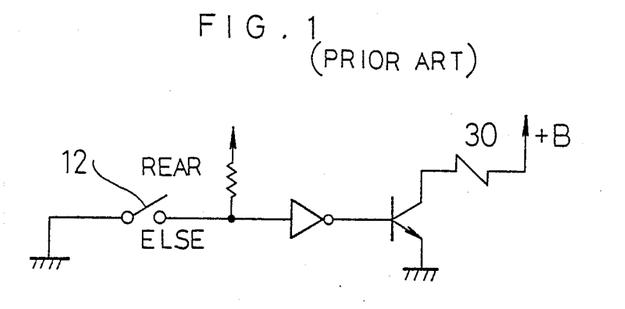
FIGS. 1 and 2 show conventional control circuits.
Figure 2:
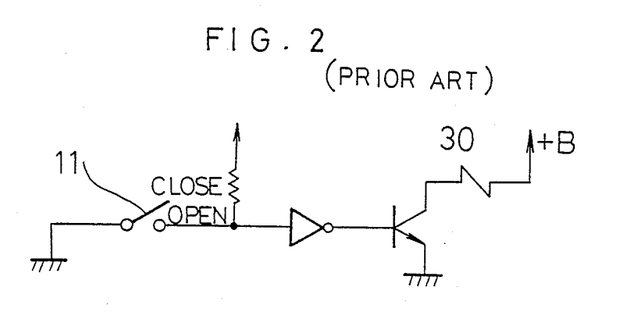

FIGS. 1 and 2 illustrate by way of example conventional control circuits for such an ELR. The former control circuit is applied to a passive seat belt system of a type such that an anchor is caused to move by a motor. When an associated webbing is not at the applied end, a rear switch 12 is closed to turn on a solenoid 30 which serves to control the locking of an associated ELR as will be described subsequently. As a result, the ELR is preventing from locking the webbing. The latter control circuit is applied to a passive seat belt system of a type such that an anchor does not move. An associated ELR is prevented from locking an associated webbing only when an associated door switch or latch switch 11 is closed.

In the case of a type that the blocking of an ELR is controlled as mentioned above responsive to the switch 12 which indicates the presence of a webbing at a retreated end, there is a potential problem that the ELR could no longer be controlled if the switch 12 fails. In the case of another type that the blocking of an ELR is controlled by using one or more mechanical elements, there is also a high chance that the operation of the ELR could be hampered by friction and breakdown of the transmitting part.

Conventional passive seat belt systems, including the above-exemplified systems, have not been able to get rid of other inconvenience, for example, that an ELR is actuated upon movement of a passenger seat when the ELR is mounted on the passenger seat.

SUMMARY OF THE INVENTION

With the foregoing in view, an object of this invention is to control an ELR so as to permit or prevent the operation of the ELR under predetermined specific conditions and thereby to eliminate the inconvenience that the ELR is actuated even when the operation of the ELR is not needed, so that a safe passive seat belt system is provided.

Another object of this invention is to provide a passive seat belt system in which even after an ELR has been actuated, locking of the ELR is detected so as to remove a force applied to the ELR and hence to release the locking.

In a first embodiment of the invention, a control means prevents the ELR from locking only for a predetermined time after the associated door is closed, as measured by a timer which is actuated each time the door is closed. A second embodiment of the invention includes an emergency release buckle switch which detects whether the buckle is located at the restraint end and whether the webbing is attached to the buckle via the emergency release buckle, and the control means allows the ELR to lock when this switch has been actuated.

In a third embodiment of the invention, a first control means prevents the ELR from locking when the anchor has not moved the occupant-restraining position, but a second control means overrides the first control means and allows the ELR to lock if a sensor detects a speed change of the vehicle greater than a predetermined value.

A fourth embodiment of the invention is applicable to a vehicle having a power seat, and movement of the power seat is prevented when the ELR is locked. In a similar embodiment, a control means reverse the movement of the power seat, upon locking of the ELR to release the locking. In a still further embodiment, the control means reverses the movement of the anchor upon locking of the ELR.

A fifth embodiment prevents the ELR from locking when the seat is being slid by employing a control means to prevent the ELR from locking only when the seat is being slid and the door has been opened.

Finally, in a sixth embodiment of the invention, the control means prevents locking of the ELR when the door is opened, unless a sensor senses a speed change of the vehicle which is greater than a predetermined amount.

The present invention is applicable to passive seat belt systems of any type, including those equipped with an anchor which is caused to move by a motor or the like, those making use of an emergency release buckle, which is manually releasable to unlock the above lock means, and those fitted with a retractor of the spool release type in which even when an ELR is in a locked state, the locking of a webbing is released by pushing or pulling a lever so as to permit release the webbing as desired.

In the present invention, a judgement is first made whether a webbing is applied or not. In accordance with results of the judgement, emergency locking of the webbing is either permitted or prevented. Therefore, the emergency locking operation is performed without failure. Moreover, the present invention has solved the inconvenience that the emergency locking operation could take place even when it is not needed. In addition, even if the emergency locking operation is performed when it is not needed, the locking can be released promptly.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENTS

Figure 29:
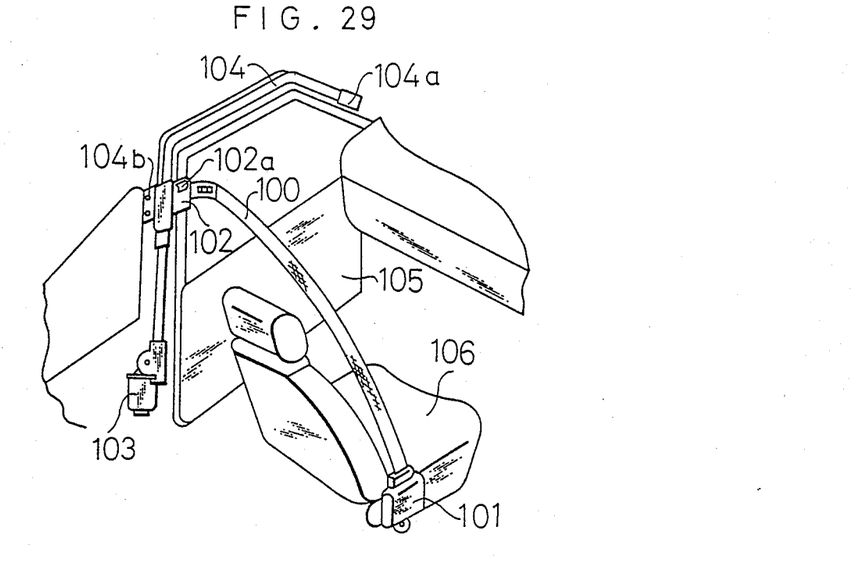
FIGS. 29 through 32 schematically illustrate the external appearance of passive seat belt systems to each of which the present invention has been applied.
Figure 30:
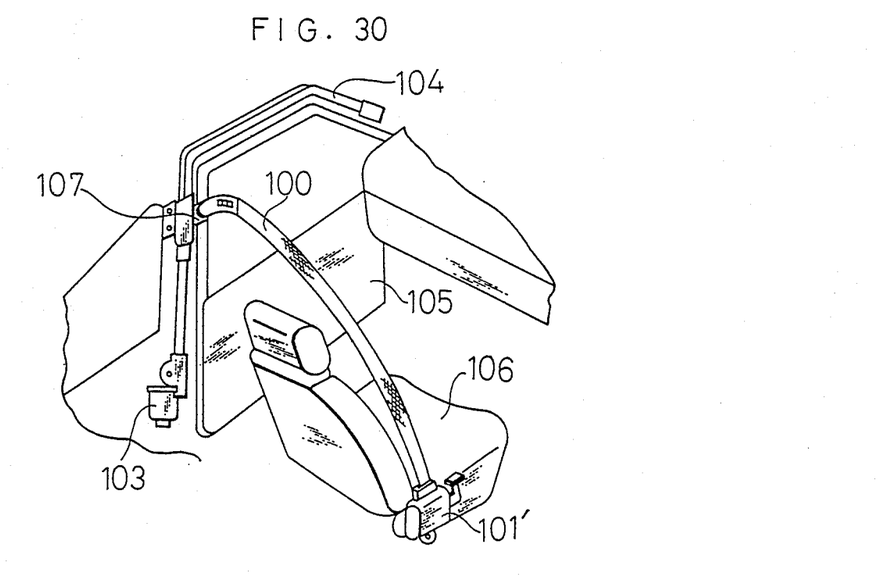

FIGS. 29 and 30 illustrate embodiments of the present invention, in which the present invention has been applied to passive seat belt systems of the type that an anchor is driven by using a motor or the like. Numeral 100 indicates an occupant-restraining webbing. One end of the webbing 100 is connected to an anchor 107 provided slidably along a guide rail 104 which extends along the length of the body of a vehicle, so that the webbing 100 is reciprocated between an advanced end 104a (upon release) and a retreated end 104b (upon application) of the guide rail 104, and is held in place at the retreated end 104b. This reciprocal movement of the webbing 100 is achieved under control of motor 103.

The other end of the webbing 100 is releasably taken up by a retractor 101 (101') mounted on an associated passenger seat 106 or the floor of the vehicle. Specifically, the webbing 100 is biased by a take-up spring (not shown) provided in the retractor 101 (101') so that the webbing 100 is releasably wound on a drum (not shown) of the retractor 101 (101').

In the embodiment depicted in FIG. 29, numeral 102 indicates an emergency release buckle (ERB) latched releasably with the anchor 107 and numeral 102a designates a release button for the ERB 102.

In the embodiment shown in FIG. 30, the present invention is applied to a passive seat belt system of the type that such a buckle is not used and a spool release retractor is used instead.

Designated at numeral 105 is an associated door.

Figure 31:
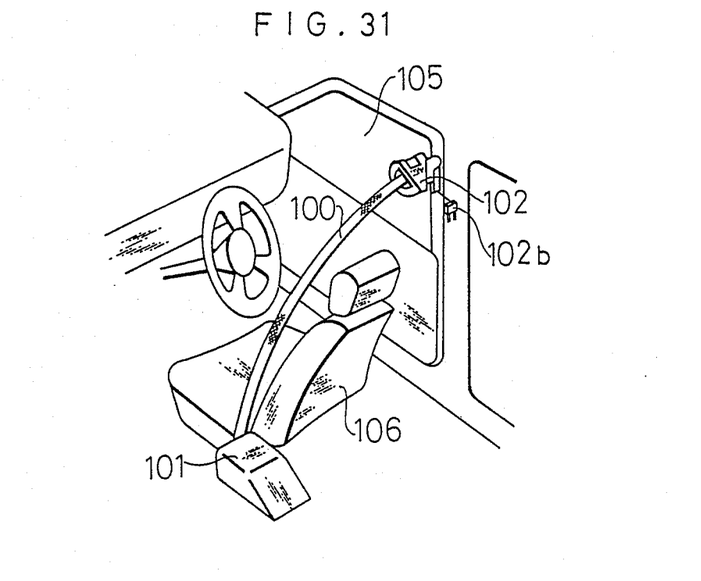

In the embodiment illustrated in FIG. 31, the present invention has been applied to a passive seat belt system of the type that an anchor is not moved and an ERB is used instead. In this embodiment, a latch switch 102b is actuated upon latching the buckle 102.

Figure 32:
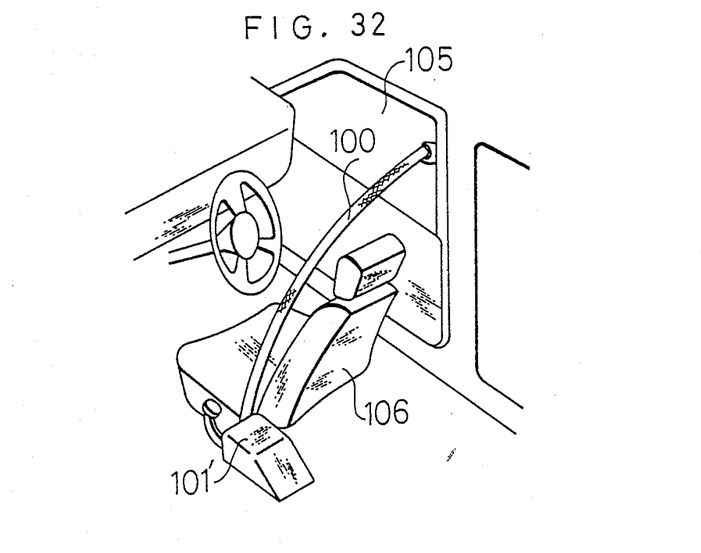

In the embodiment shown in FIG. 32, the present invention has been applied to a passive seat belt system of the type that an anchor is not moved and a spool release retractor is used instead.

Figure 3:
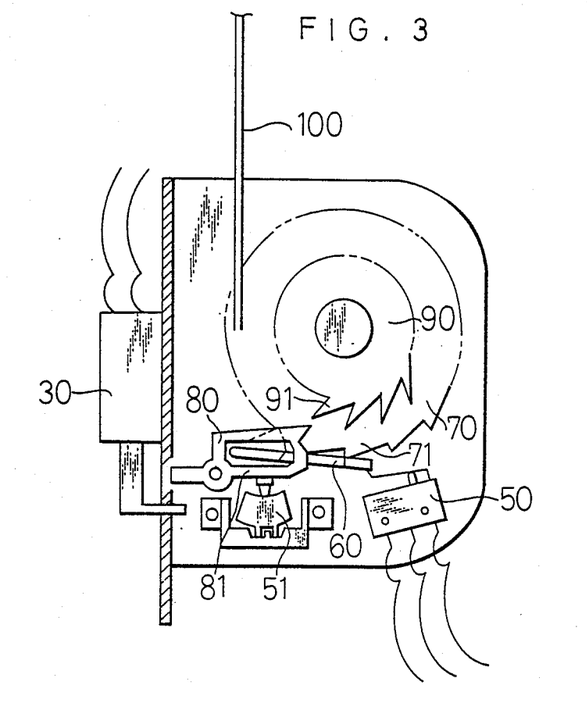
FIG. 3 is a schematic fragmentary side view of a passive seat belt system according to one embodiment of this invention.
Figure 4:
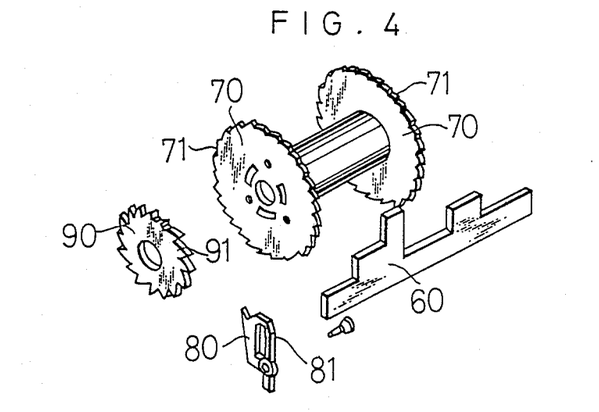
FIG. 4 is an exploded fragmentary perspective view of the passive seat belt system of FIG. 3.

The structure of an ELR according to this invention is shown in FIGS. 3 and 4.

When a lock lever 60 is out of engagement with any teeth 71 of cog wheels 70, the free edge of the lock lever 60 is located at a height lower than the opposite edge thereof to depress a lock detection switch 50 of the ELR. When an acceleration is applied and an inertia member 51 is caused to move, a ratchet lever 80 is lifted upwards so that the ratchet lever 80 is brought into engagement with one of teeth 91 of a ratchet wheel 90. The ratchet gear 90 then causes the ratchet lever 80 to turn counterclockwise, whereby a lower part 81 of the ratchet lever 80 causes the lock lever 60 to turn counterclockwise so that the lock lever 60 is brought into engagement with the teeth 71 of the cog wheels 70 to stop the rotation of the reel. Since the lock lever 60 moves upwards to engage the teeth 71, the lock detection switch 50 detects the locking of the ELR.

When a solenoid 30 is energized, the ratchet lever 80 is biased clockwise so that the ratchet lever 80 is prevented from engaging with the ratchet gear 90 so as to prevent locking of the ELR (i.e., to maintain the ELR in a state prevented from locking).

Figure 5:
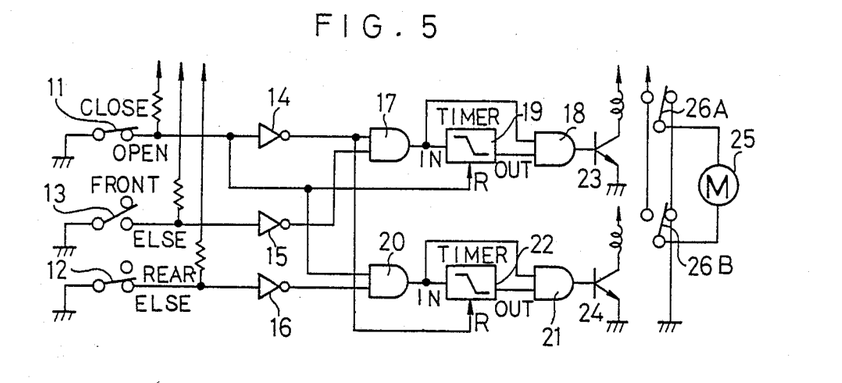
FIG. 5 is a circuit diagram showing one example of a webbing drive unit of the passive seat belt system of FIG. 1.

In the circuit diagram shown in FIG. 5, there are timers which watch the time spans of movement of an anchor in the frontward and rearward directions in each of the passive seat belt systems of FIGS. 29 and 30.

In FIG. 5, there are shown a door switch 11 which is turned on or off in accordance with closure or opening of the door, a rear switch 12 which is turned off or on depending whether the anchor is located at the retreated end or not, a front switch 13 which is turned off or on depending on whether the anchor is located at the advanced end or not, and inverters 14, 15,16.

AND gates 17,18 and a timer 19 then watch the time of movement of the anchor 107 in the frontward direction when the door 105 is opened and the front switch 13 is closed (namely, when the anchor 107 is not at the advanced end).

On the other hand, AND gates 20,21 and a timer 22 watches the time of movement of the anchor 107 in the rearward direction when the door 105 is closed and the rear switch 12 is closed.

Since the operation of the timer 19 is the same as that of the timer 22, a description will next be made on the operation of the timer 22 only.

Regarding the timer 22, when an input In is 1 as shown in the drawing, the output OUT remains at 1 for a predetermined period of time and then changes to 0. When the input In is 0, the output OUT always remains at 1. When the level of a control terminal R is 1, the output OUT is 1 regardless of the input.

When the anchor 107 moves in the rearward direction from the advanced end, the timer 22 counts up unless the anchor 107 reaches the retreated end within a predetermined period of time (namely, before the timer 22 reaches a time-up state) so that the timer 22 shuts down a drive current to the motor 25.

Designated at numerals 23,24 are driver transistors for driving the motor 25 in the forward and reverse directions respectively. Numerals 26A,26B indicate relays respectively.

The circuits for controlling the emergency locking operation of the above ELR will next be described in detail.

Figure 6:
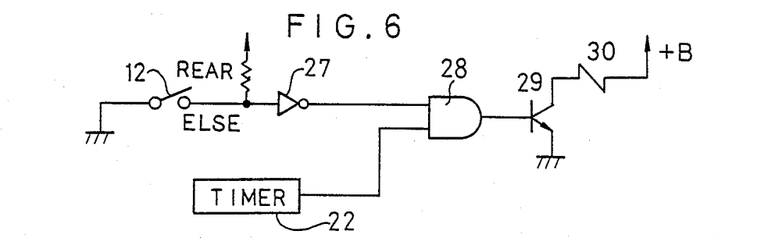
FIGS. 6 through 12 are control circuit diagrams showing different embodiments of this invention respectively.

FIG. 6 illustrates one example of an electric circuit for energizing the solenoid 30 of FIG. 3 by detecting that the webbing 100 is not at the retreated end.

Let's now assume that a signal from the timer 22 is at the high level. When the rear switch 12 is closed (namely, the anchor 107 is not at the retreated end), the output of the inverter 27 is also at the high level so that the AND gate 28 is opened. As a result, the transistor 29 is also turned on and the solenoid 30 is hence energized to prevent the ELR from locking the webbing 100.

In this embodiment, the time of rearward movement of the anchor 106 is watched by the timer 22 for the following reasons.

Let's now assume that the rear switch 12 is provided as a sole means for judging whether the webbing 100 is applied or not (see FIG. 1). If the rear switch 12 should be broken while it is closed, the ELR is prevented from locking the webbing 100 although the anchor 107 is at the retreated position. The webbing 100 cannot hence be locked even in the event of an emergency.

Owing to the provision of a watching means composed of the timer 22, the anchor 107 is deemed to reach its retreated end upon time-up of the timer 22 even when the rear switch 12 is broken. The drive current to the motor 25 is hence shut down, thereby protecting the motor 25 and permitting emergency locking of the ELR. The above-mentioned inconvenience has now been solved.

Figure 7:
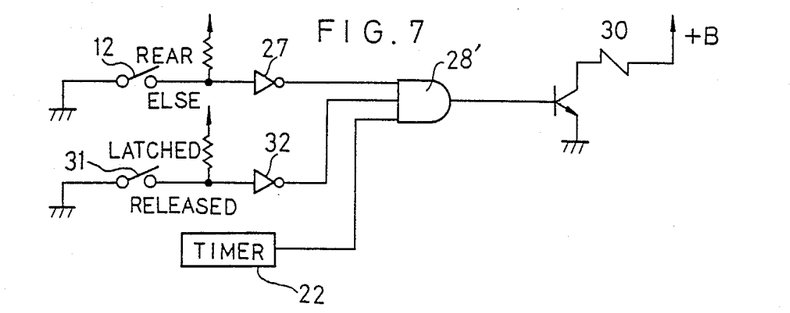

Turning next to FIG. 7, it is also detected in the embodiment of FIG. 6 whether the buckle (102 in FIG. 29) has been latched or not, whereby it is judged whether the webbing 100 has been applied or not.

Since the output of an inverter 32 is at the low level when a buckle switch 31 provided on the body of the vehicle at a location corresponding to the retreated position of the anchor 107 is in a latched state, the AND gate 28' is closed to permit emergency locking of the ELR.

This embodiment is based on the following concept.

Since detection of insertion of a tongue of the buckle 102 which is used to release one end of the webbing 100 from the anchor 107 after locking of the ELR in the event of an emergency is effected only when the anchor 107 is at the retreated end, emergency locking of the ELR is assured by the detection of latching of the buckle 102 even when the rear switch 12 has been broken and the watching of rearward movement of the anchor 107 by the timer 22 has resulted in a failure for certain reasons.

Figure 8:
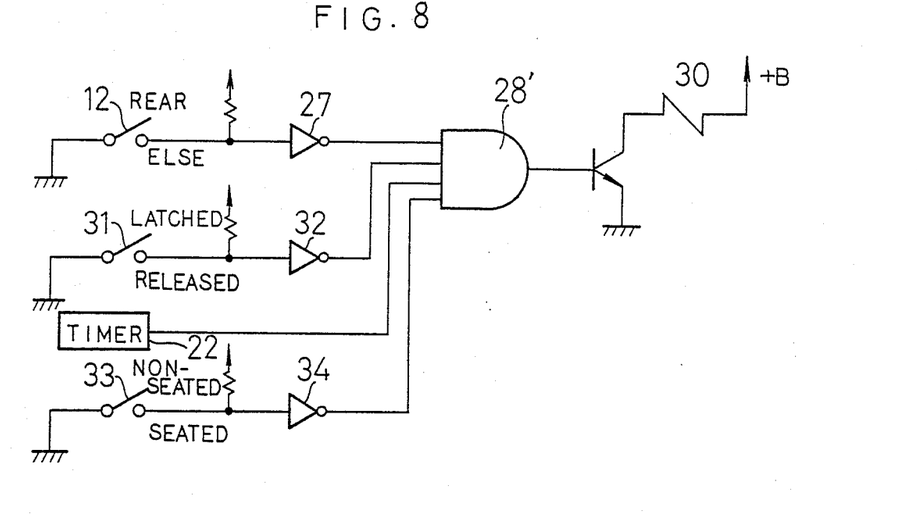

In FIG. 8, the control means is also rendered inoperative so that emergency locking of the ELR is prevented in the embodiment of FIG. 7 when no occupant is in the associated passenger seat.

When a seat switch 33 provided with the passenger seat is turned off (when no occupant is in the passenger seat), the output of an inverter 34 is set at the LOW level to close the AND gate 28' so that feeding of a current to the solenoid 30 is stopped.

The present embodiment is based on the following concept.

The aforementioned embodiments (FIGS. 7 and 8) are both based on a fail safe concept. Namely, the ELR is prevented from locking the webbing 100 while a current is fed to the solenoid 30 (this period is relatively short) but is allowed to lock the webbing 100 while no current is fed for the solenoid 30 (this period is relatively long). In a system where the anchor 107 stops at the advanced end when the vehicle is parked (there is a system in which the door 105 is closed when an ignition is turned off but the anchor 107 does not move in the rearward direction in order to avoid any meaningless movement of the anchor 107 when the vehicle is not driven), the solenoid 30 remains energized during the parking of the vehicle so that its battery is eventually drained up.

Hence, the seat switch 33 is provided to detect that the vehicle has been parked. When the seat switch 31 does not indicate occupation of the associated passenger seat by an occupant, the vehicle is judged to be parked so that feeding of a current to the solenoid 30 is stopped.

Figure 9:
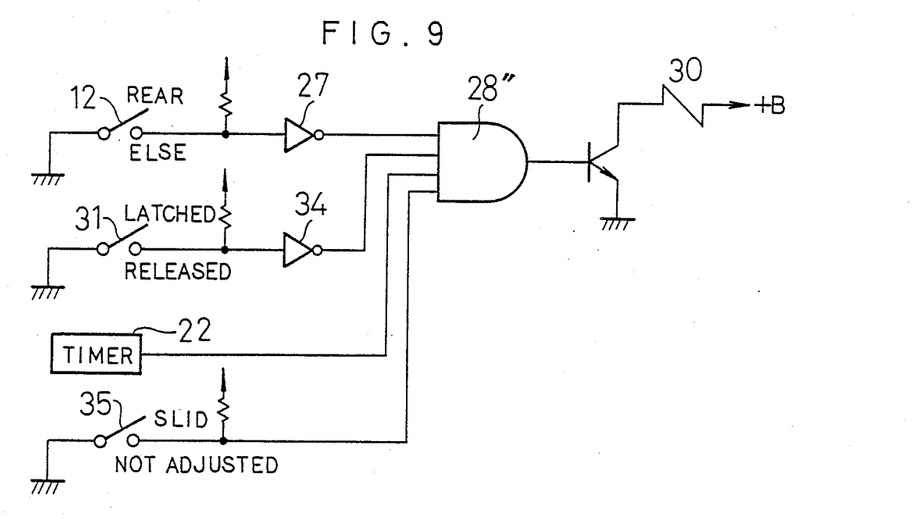

In FIG. 9, the ELR is also prevented from emergency locking when the passenger seat is caused to move in the embodiment of FIG. 7.

When a seat slide detection switch 35 provided with the passenger seat is opened (which is closed normally but is opened when one wants to slide the passenger seat), an AND gate 28'' is opened to energize the solenoid 30, so that the ELR is prevented from locking the webbing 100 (needless to say, as prerequisites, the other rear switch 12 and buckle switch 31 are both closed and the output of the timer 22 is at the HIGH level.).

Where the passenger seat is a power seat, the above seat slide detection switch 35 may be replaced by another switch which is opened by a drive signal of the power seat motor.

This embodiment is based on the following concept.

When a passenger seat is caused to move in a system in which an ELR is mounted on a passenger seat, the ELR is actuated by a shock of the movement.

When the passenger seat is caused to move in a webbing-releasing direction, the ELR is actuated in that state so that a tensile force remains applied to the webbing. The webbing is also applied with a force which has in turn been applied to cause the passenger seat to move. It is hence difficult to release the buckle 102 because of the tension in the webbing. If the passenger seat is forced to move in a state that the ELR has locked, there is a possible problem that the anchor 107, guide rail 104 and the like connected to the webbing 100 could be broken. When a power seat is provided, the large power of a power seat motor is continuously applied, by way of the webbing 100 thus locked, to the anchor 107, guide rail 104 and the like which are connected to the webbing 100.

Further, from the standpoint of fail safe, it is desirable to minimize the period in which the ELR is prevented from locking the webbing (in which the solenoid 30 remains in an energized state).

The dark current (the current consumed while the vehicle is parked) which may become a problem in the embodiment of FIG. 8 is little in this embodiment.

Figure 10:
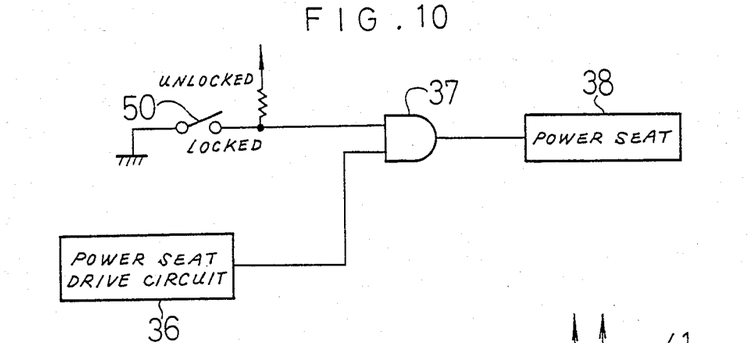
Figure 11A:
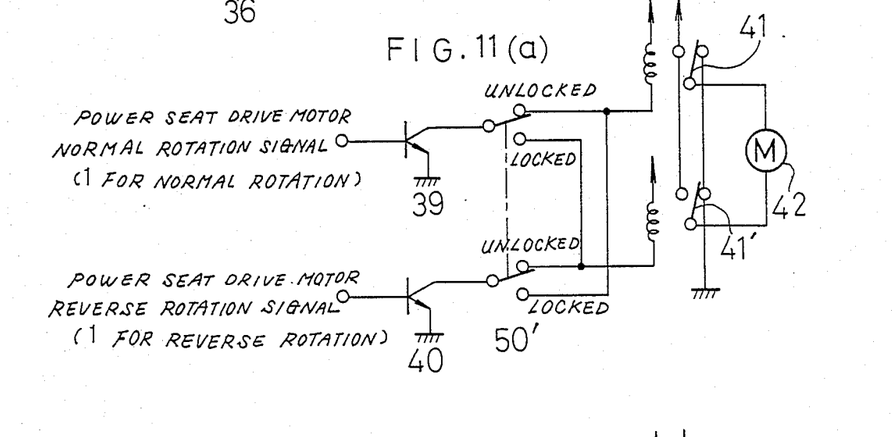
Figure 11B:
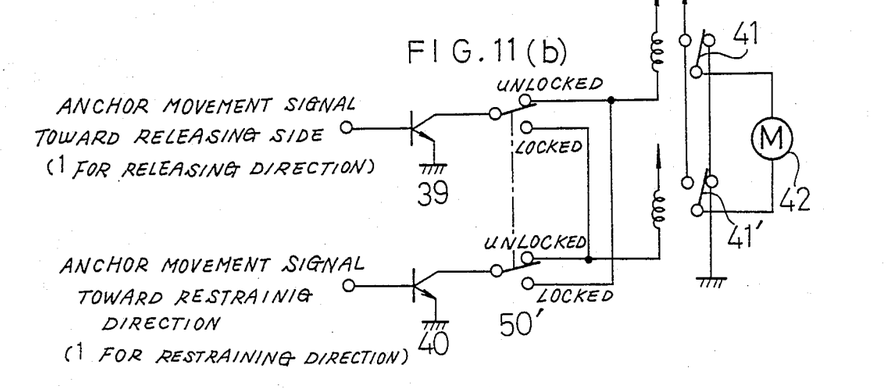

The embodiments of FIGS. 10, 11(a) and 11(b) are each constructed to control the drive of a power seat 38 when the power seat 38 has been employed and the ELR has been actuated by a movement of the power seat 38.

When the switch 50 (see FIG. 3) for detecting the locking of the ELR is closed, an AND gate 37 which receives as its inputs an output from the switch 50 and another output from a power seat drive circuit 36 is closed to stop the driving of the power seat 38. When the switch 50 is opened, the power seat 38 is driven (FIG. 10).

FIG. 11(a) shows by way of example that when the ELR is locked, the direction of movement of the power seat 38 is reversed to release the locking.

In FIG. 11(a), there are shown drive transistors 39,40, an ELR locking detection switch 50', relays 41,41', and a motor 42.

Although this embodiment is illustrated as the drive circuit 36 for the power seat 38, a similar design may also be used for a drive circuit for the anchor 107. Such an embodiment is shown in FIG. 11(b). The circuit diagram of FIG. 11(b) is substantially the same as that illustrated in FIG. 11(a) except for the change of input signals.

Figure 12:
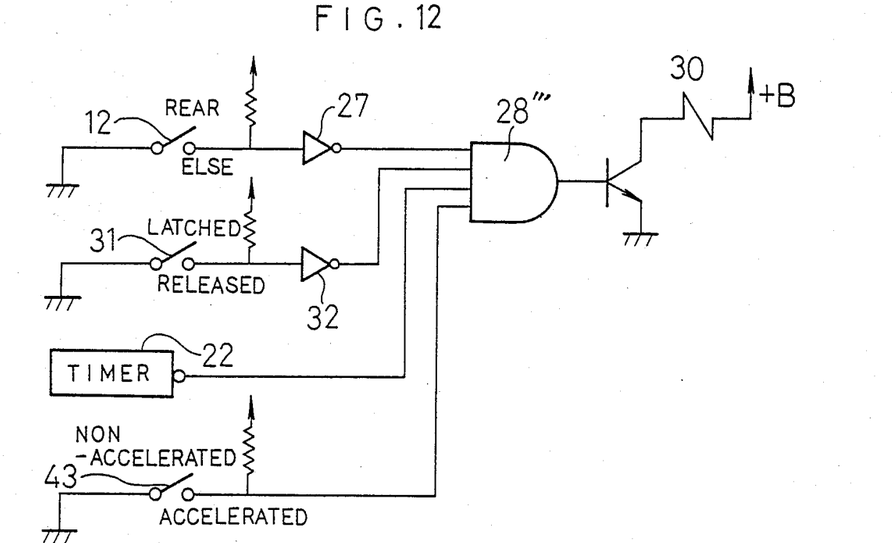

FIG. 12 shows a further embodiment, similar to the embodiment of FIG. 7, in which an output of a high acceleration sensor 43 is also used as an additional input for an AND gate 28'" In this embodiment, the prevention of locking of the ELR is inhibited or released when the high acceleration sensor 43 has detected a high acceleration.

The rear switch 12 is triggered by the anchor 107 by way of a latch-like member provided on the vehicle body. When the anchor 107 is pulled in the event of a collision of the vehicle, the latch-like member may be deformed, resulting in a contact separation from the rear switch 12 so that the anchor 107 looks as if it is not at the retreated end. In such a case, a presumption is made by the high acceleration sensor 43 to avoid prevention of locking of the ELR.

Figure 13:
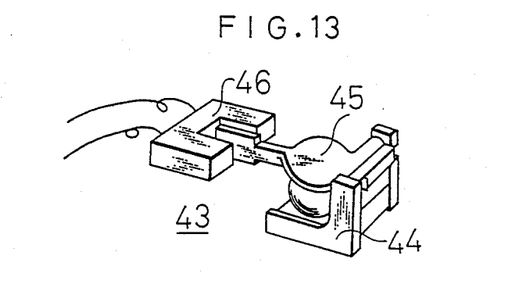
FIG. 13 is a perspective view depicting one example of a high acceleration sensor which is applicable to the present invention.
Figure 14:
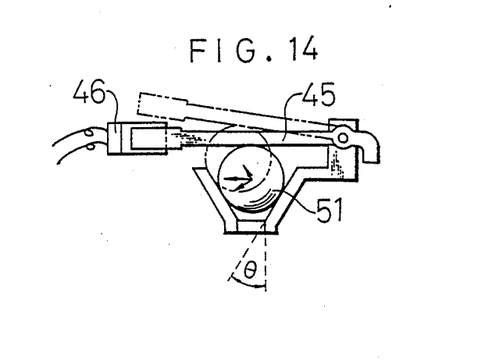
FIG. 14 is a fragmentary schematic view of the sensor of FIG. 13.
Figure 15:
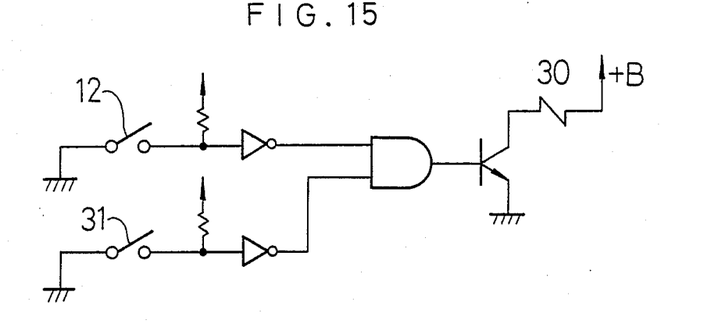
FIGS. 15 through 28 are control circuit diagrams showing further different embodiments of this invention respectively.
Figure 16:
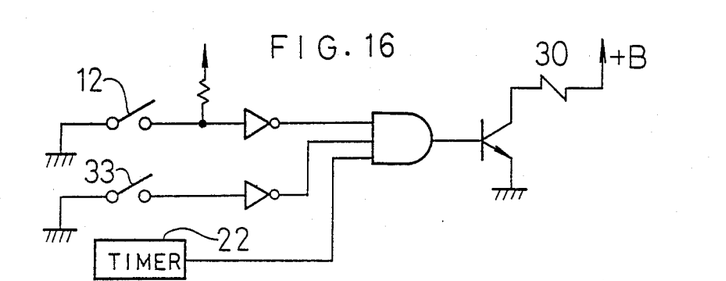
Figure 17:
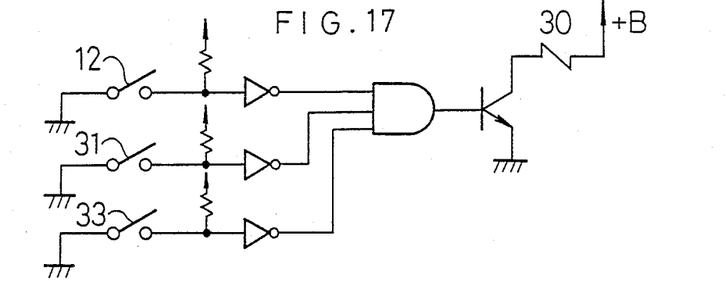
Figure 18:
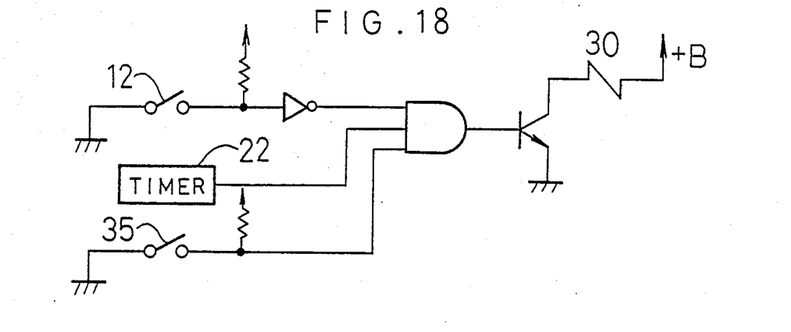
Figure 19:
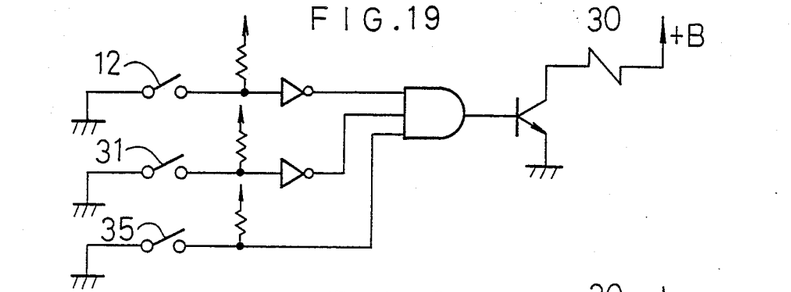
Figure 20:
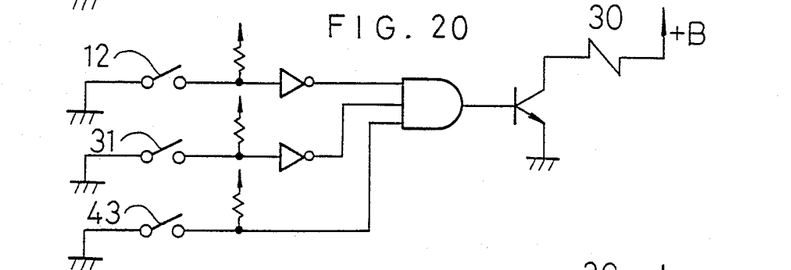
Figure 21:
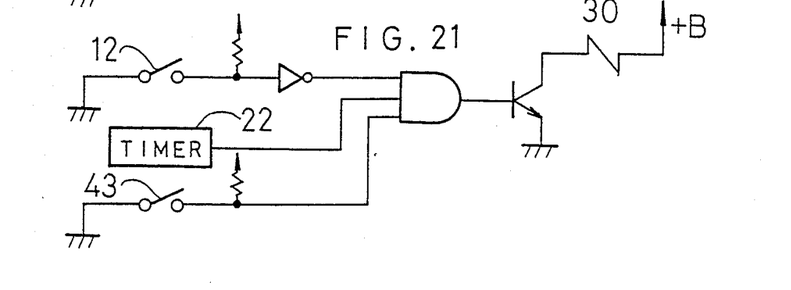
Figure 22:
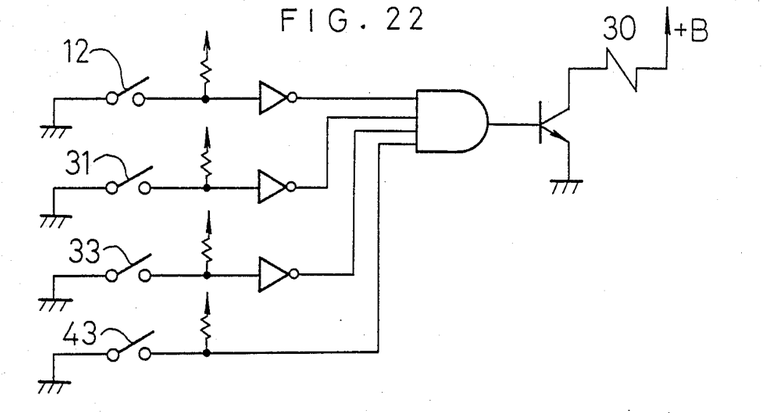
Figure 23:
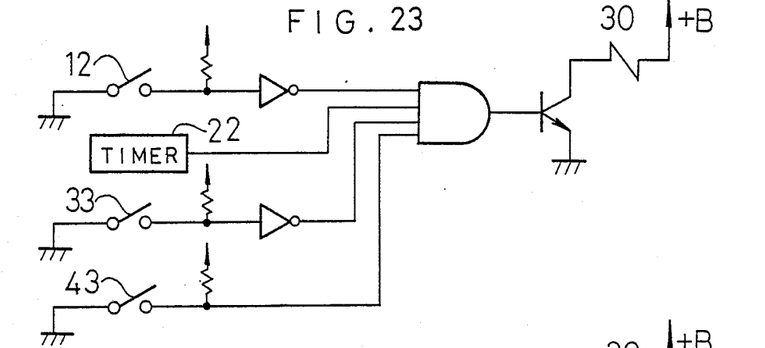
Figure 24:
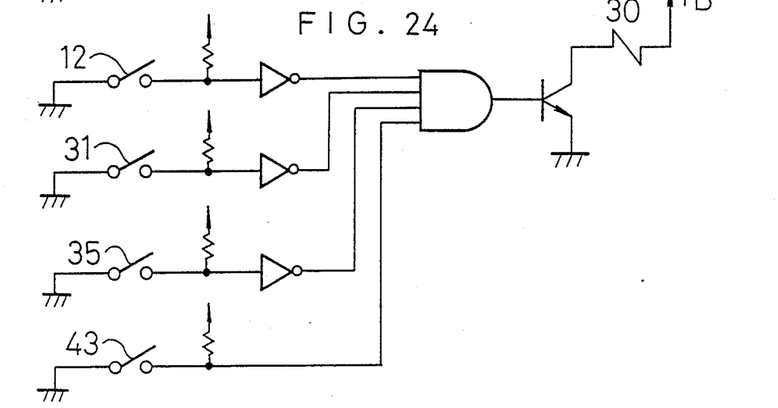
Figure 25:
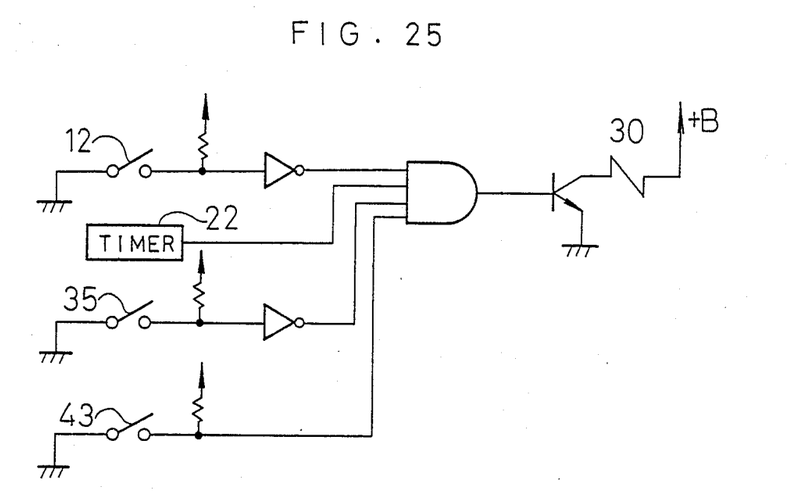

One example of the high acceleration sensor 43 is illustrated in FIGS. 13 and 14.

Namely, the high acceleration sensor 43 is constructed of a seat 44 having a conical recess in which the inertia member (ball) 51 is received, a sensor arm 45 attached pivotally to the seat 44 and lying on the inertia member 51, and a phototransistor 46 opposing the free end of the sensor arm 45 so that an optical axis is interfered by a free end portion of the sensor arm 45.

The recess of the seat 44, in which the inertia member 51 is received, has a steep wall as indicated by $\theta$ in FIG. 14. When an acceleration greater than $G \cdot \tan^{-1}\theta$ is applied in a direction transverse the inertia member 51, the inertia member 51 is caused to move to lift the sensor arm 45 so that light, which has been shielded by an arm 45 by that time, is allowed to travel and the output of the phototransistor 46 is hence reversed.

The present invention has been described in detail centering on passive seat belt systems of the type that the anchor 107 is driven by the motor 103 and the emergency release buckle 102 is used. The present invention is however not necessarily limited to such passive seat belt systems. It is also possible to combine the present invention with those of a type in which the anchor is not moved or in which a spool release retractor is used.

FIGS. 15 through 28 illustrate modifications of the above-described embodiments of this invention, which have been altered in view of the above-described combinations.

The following types of passive seat belt systems may be contemplated when such modifications are applied to the above-mentioned embodiments. Type A: The anchor 107 is driven by the motor 103 and the emergency locking buckle 102 is used (see FIG. 29).

FIGS. 15 through 31 are applicable.

When the power seat 38 is used, it is also possible to use it in combination with the embodiments of the above-described FIGS. 6–9, 10 and 11. Type B: The anchor 107 is driven by the motor 103 and a spool release retractor is used (see FIG. 30).

The embodiments shown in FIGS. 16, 18, 21, 23 and 25 are all applicable (among the above-described embodiments, the embodiment depicted in FIG. 6 is applicable).

When a power seat is used, it is possible to use the embodiments of FIGS. 10 and 11(a) in combination. Type C: The anchor 107 is not caused to move and the emergency release buckle 102 is used instead (see FIG. 31).

Figure 26:
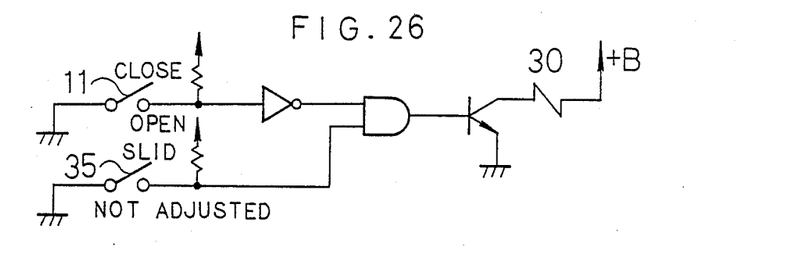
Figure 27:
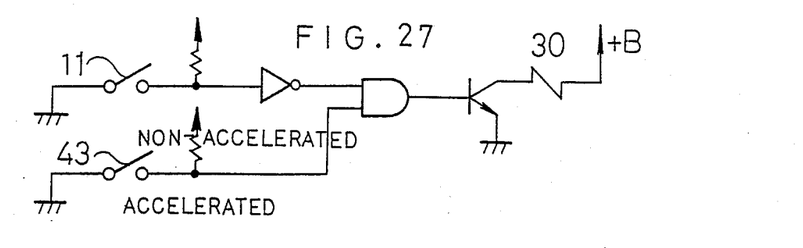
Figure 28:
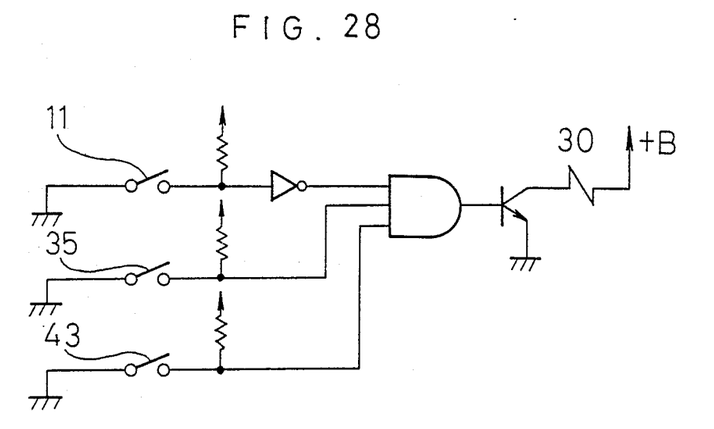

The embodiments of FIGS. 26–28 are all applicable.

When a power seat is used, it is possible to use the embodiments of FIGS. 10 and 8 in combination. Type D: The anchor 107 is not caused to move and the an emergency release retractor is used instead (see FIG. 31).

The embodiments of FIGS. 26–28 are all applicable.

In the embodiments illustrated in FIGS. 15–28, the rear switch 12 (in the types in which the anchor 107 is movable) or by the door switch 11 (in the case of the types in which the anchor 107 is not movable) detects whether the webbing 100 has been applied or not. In addition, the solenoid 30 which controls the locking of the ELR is energized or de-energized by the detection means which comprises in combination the ERB switch 102, which is opened when an emergency release buckle ERB is at the retreated end and is latched but is closed when the emergency release buckle ERB is not at the retreated end or its tongue has not been inserted, the seat switch 33 (described above), the seat slide detection switch 35 (described above) and the high acceleration sensor 43 (described above). Their detailed operations are omitted from the present specification, because they are believed to be readily understood from the above-described various embodiments of this invention.

Having now fully described the invention, it will be apparent to one of ordinary skill in the art that many changes and modifications can be made thereto without departing from the spirit or scope of the invention as set forth herein.

We claim:

1. A passive seat belt system comprising:
   a guide rail;
   an anchor movable along the guide rail;
   a webbing connected at one end thereof to the anchor, said webbing being taken up from the other end thereof by an emergency locking retractor;
   a drive means for causing the anchor to move between a restraint position, where the webbing restrains an occupant, and a release position where the occupant is free from restraint by the webbing;
   a timer capable of reaching a time-up state upon an elapsed time of a predetermined interval of time after closure of an associated door and releasing the time-up state upon opening of the door; and
   a control means for allowing the retractor to lock the webbing after the timer has reached the time-up state.

2. The system as claimed in claim 1, further comprising a switch for detecting whether the anchor is at the restraint position, said control means also allowing the retractor to lock the webbing when the switch has detected the presence of the anchor at the restraint position.

3. The system as claimed in claim 2, wherein the timer reaches the time-up state only while the switch is detecting the absence of the anchor at the restraint position.

4. A passive seat belt system comprising:
   a guide rail;
   an anchor movable along the guide rail;
   a webbing connected detachably at one end thereof to the anchor by way of an emergency release buckle, said webbing being taken up from the other end thereof by an emergency locking retractor;
   a drive means for causing the anchor to move between a restraint position, where the webbing restrains an occupant, and a release position where the occupant is free from restraint by the webbing;

an emergency release buckle switch provided near the restraint position of the anchor, said switch being actuated when the anchor is located at the restraint position and the one end of the webbing s connected to the anchor by way of the emergency release buckle;

a switch for detecting whether the anchor is at the restraint position; and a control means for allowing the retractor to lock the webbing when the emergency release buckle switch has been actuated and also when the switch has detected the presence of the anchor at the restraint position.

5. The system as claimed in claim 4, further comprising a timer capable of reaching a time-up state upon an elapsed time of a predetermined interval of time after closure of an associated door and releasing the time-up state upon opening of the door, said control means also allowing the retractor to lock the webbing after the timer has reached the time-up state.

6. The system as claimed in claim 5, wherein the timer reaches the time-up state only when the switch detects the absence of the anchor at the restraint position.

7. A passive seat belt system comprising:
a guide rail;
an anchor movable along the guide rail;
a webbing connected detachably at one end thereof to the anchor by way of an emergency release buckle, said webbing being taken up from the other end thereof by an emergency locking retractor;
a drive means for causing the anchor to move between a restraint position, where the webbing restrains an occupant, and a release position where the occupant is free from restraint by the webbing;
an emergency release buckle switch provided near the restraint position of the anchor, said switch being actuated when the anchor is located at the restraint position and the one end of the webbing is connected to the anchor by way of the emergency release buckle;
a timer capable of reaching a time-up state upon an elapsed time of a predetermined interval of time after closure of an associated door and releasing the time-up state upon opening of the door; and
a control means for allowing the retractor to lock the webbing when the emergency release buckle switch has been actuated and also after the timer has reached the time-up control means also allowing the retractor to lock the webbing after the timer has reached the time-up state.

8. The system as claimed in claim 8, wherein the timer reaches the time-up state only when the switch detects the absence of the anchor at the restraint position.

9. A passive seat belt system comprising:
a guide rail;
an anchor movable along the guide rail;
a webbing connected at one end thereof to the anchor, said webbing being taken up from the other end thereof by an emergency locking retractor which comprises a first sensor capable of being actuating upon detection of a speed change of at least a predetermined value applied to the retractor and a lock means for preventing any further release of the webbing upon actuation of the first sensor;
a drive means for causing the anchor to move between a restraint position, where the webbing restrains an occupant, and a release position where the occupant is free from restraint by the webbing;
a switch for detecting whether the anchor is at the restraint position;
a second sensor capable of being actuated upon detection of a speed change of a value greater than the predetermined value;
a first control means for preventing the retractor from locking the webbing upon detection of the absence of the anchor at the restraint position by the switch; and
a second control means for allowing the retractor to lock the webbing so long as the second sensor has been actuated, even when the switch has detected the absence of the anchor at the restraint position.

10. The system as claimed in claim 9, wherein the system further comprises an emergency release buckle and an emergency release buckle switch, the one end of the webbing is connected detachably to the anchor by way of the emergency release buckle, the emergency release buckle switch is provided near the restraint position of the anchor and is actuated when the anchor is at the restraint position and the other end of the webbing is connected to the anchor by way of the emergency release buckle, and the second control means also allows the retractor to lock the webbing when the emergency release buckle switch has been actuated.

11. The system as claimed in claim 9, further comprising a timer capable of reaching a time-up state upon an elapsed time of a predetermined interval of time after closure of an associated door and releasing the time-up state upon opening of the door, said second control means also allowing the retractor to lock the webbing when the timer has reached the time-up state.

* * * * *